United States Patent
Benedict et al.

(10) Patent No.: US 10,373,667 B2
(45) Date of Patent: Aug. 6, 2019

(54) REFRESH RATE ADJUST

(71) Applicant: HEWLETT PACKARD ENTERPRISE DEVELOPMENT LP, Houston, TX (US)

(72) Inventors: Melvin K. Benedict, Houston, TX (US); Eric L. Pope, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 402 days.

(21) Appl. No.: 14/913,872

(22) PCT Filed: Aug. 28, 2013

(86) PCT No.: PCT/US2013/057094
§ 371 (c)(1),
(2) Date: Feb. 23, 2016

(87) PCT Pub. No.: WO2015/030751
PCT Pub. Date: Mar. 5, 2015

(65) Prior Publication Data
US 2016/0211008 A1    Jul. 21, 2016

(51) Int. Cl.
| | |
|---|---|
| *G06F 3/00* | (2006.01) |
| *G11C 11/406* | (2006.01) |
| *G06F 12/10* | (2016.01) |
| *G06F 11/07* | (2006.01) |
| *G06F 3/06* | (2006.01) |
| *G06F 13/16* | (2006.01) |

(Continued)

(52) U.S. Cl.
CPC .......... *G11C 11/406* (2013.01); *G06F 3/0619* (2013.01); *G06F 3/0622* (2013.01); *G06F 3/0629* (2013.01); *G06F 3/0673* (2013.01); *G06F 11/073* (2013.01); *G06F 11/076* (2013.01); *G06F 11/0751* (2013.01); *G06F 12/10* (2013.01); *G06F 13/1636* (2013.01); *G11C 7/02* (2013.01); *G11C 11/40611* (2013.01); *G11C 11/40622* (2013.01); *G06F 21/566* (2013.01); *G11C 2211/4061* (2013.01)

(58) Field of Classification Search
None
See application file for complete search history.

(56) References Cited

U.S. PATENT DOCUMENTS

| | | | |
|---|---|---|---|
| 4,754,425 | A | 6/1988 | Bhadriraju |
| 5,883,849 | A | 3/1999 | Shirley |

(Continued)

FOREIGN PATENT DOCUMENTS

| | | |
|---|---|---|
| CN | 1697077 | 11/2005 |
| CN | 1702767 | 11/2005 |
| KR | 20050120344 | 12/2005 |

OTHER PUBLICATIONS

Alchesky, L.C. et al.; "Single-bit-errors"; Apr. 7, 2005; 13 pages.

(Continued)

*Primary Examiner* — Midys Rojas
(74) *Attorney, Agent, or Firm* — Mannava & Kang, P.C.

(57) ABSTRACT

A technique includes determining that a row of memory has been activated at a threshold rate. Upon reaching the threshold rate, a refresh rate for the row of memory and an adjacent row of memory may be increased. Subsequent to the increase, the refresh rate may be returned to a default rate.

15 Claims, 6 Drawing Sheets

(51) Int. Cl.
*G11C 7/02* (2006.01)
*G06F 21/56* (2013.01)

(56) References Cited

U.S. PATENT DOCUMENTS

| | | | |
|---|---|---|---|
| 6,061,290 | A | 5/2000 | Shirley |
| 6,958,944 | B1 | 10/2005 | Chou |
| 7,099,208 | B2 | 8/2006 | Okuyama et al. |
| 7,827,861 | B2 | 11/2010 | LaWhite et al. |
| 2005/0041502 | A1 | 2/2005 | Perner |
| 2006/0085616 | A1 | 4/2006 | Zeighami et al. |
| 2007/0171751 | A1* | 7/2007 | Ho ............... G06F 13/1636 365/222 |
| 2009/0013127 | A1 | 1/2009 | Atkinson |
| 2010/0172200 | A1 | 7/2010 | Kawakubo et al. |
| 2010/0188914 | A1 | 7/2010 | Ahn et al. |
| 2010/0208537 | A1 | 8/2010 | Pelley, III et al. |
| 2010/0257415 | A1 | 10/2010 | Lin et al. |
| 2011/0283060 | A1 | 11/2011 | Ware et al. |
| 2012/0250388 | A1 | 10/2012 | Jeddeloh |
| 2012/0317352 | A1 | 12/2012 | Kang et al. |
| 2016/0103726 | A1* | 4/2016 | Benedict ........... G06F 11/073 714/48 |
| 2017/0103795 | A1* | 4/2017 | Crawford ........... G11C 11/406 |

OTHER PUBLICATIONS

Huang, R. F. et al., "Alternate hammering test for application-specific DRAMs and an industrial case study", Design Automation Conference (DAC), 2012 49th ACM/EDAC/IEEE, Jun. 3-7, 2012.
International Search Report and Written Opinion dated May 20, 2014, PCT Patent Application No. PCT/US2013/057094 filed Aug. 28, 2013, Korean Intellectual Property Office.

* cited by examiner

REFRESH RATE ADJUST

CLAIM FOR PRIORITY

The present application is a national stage filing under 35 U.S.C. § 371 of PCT application number PCT/US2013/057094, having an international filing date of Aug. 28, 2013, the disclosure of which is hereby incorporated by reference in its entirety.

BACKGROUND

A memory device includes memory cells to store data values. An example type of memory device is a dynamic random access memory (DRAM) device. As memory manufacturing technology has advanced, the feature size of memory cells has decreased to increase the density of memory cells in a memory device. Increasing the memory cell density provides increased storage capacity in the memory device. As the feature size of the memory cells decreases, however, the memory device may become more susceptible to errors.

DETAILED DESCRIPTION

Computing systems may utilize a variety of memory for varying purposes. One type of memory, volatile memory, maybe utilized as system memory due to its advantageous operating characteristics. As volatile memory has progressed, certain features have given rise to previously unencountered errors. For example, Dynamic Random Access Memory (DRAM) devices are being manufactured with feature sizes which place components closer to each other than previously possible. As a controller repeatedly accesses the same or nearby memory location, there is a potential for affecting memory in nearby locations.

More specifically, charges may be selectively stored in the capacitor-based memory cells of a dynamic random access memory (DRAM) device to represent corresponding stored data. Because leakage currents degrade the stored charges, the memory cells of the DRAM device are periodically refreshed, which involves reading the data stored in the DRAM's device memory cells and rewriting the data back to the memory cells.

Repeated activation of a given row at a high enough rate (activations on the order of thousands of times per refresh period, for example) may degrade data stored in adjacent word lines (a natural occurrence in the DRAM due to the relatively close spacing of the DRAM features), even though these word lines are periodically refreshed. This repeated activation error may be defined as a row hammer error. In other words, the periodic refresh intervals may be insufficient to maintain the stored data when the activation rates exceed a certain threshold.

In the present disclosure, methods and systems are described that mitigate the aforementioned issues. More specifically, a memory controller having an ability to detect and identify aggressor rows is disclosed. The memory controller may invoke an increased refresh rates when such a row is identified. So long as continued activates occur, the memory controller may maintain the increased refresh rate. Upon activations subsiding, the memory controller may revert the refresh rate back to a default rate. This may eliminate the high performance cost of a unilateral increased refresh rate while maintaining a level of protection against the effects of row hammer.

Figure 1:
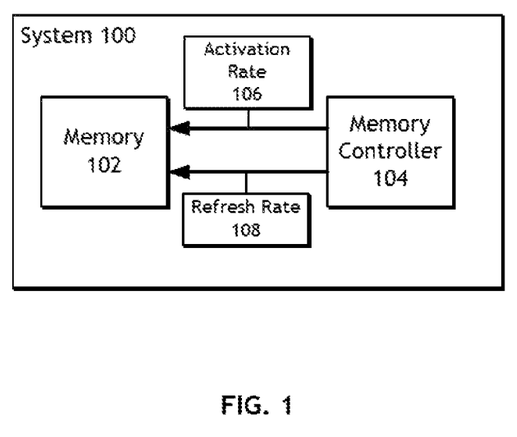
FIG. 1 is a block diagram of a system according to an example implementation.

Referring to FIG. 1, a block diagram of a system is illustrated in accordance with an example of the present disclosure. The system 100 includes a memory device 102 and a memory controller 104.

Memory device 102 may be any memory comprising an array of word lines and bit lines that are susceptible to row hammer errors. For the purposes of this disclosure, the memory devices discussed in the figures will be referred to as Dynamic Random Access Memory (DRAM), however, the disclosure is not so limited. In addition, the DRAM may be disposed with other DRAMs to form a dual in-line memory module (DIMM).

Memory controller 104 is a circuit which manages the flow of data going to and from memory device 102. While illustrated as an independent component, memory controller 104 is not so limited. Rather, memory controller 104 may be integrated into other components such as a microprocessor (not illustrated). In addition, various aspects as discussed with reference to memory controller 104 may be incorporated into memory device 102.

In the illustrated example, the system 100 comprises memory device 102 which is susceptible to various types of errors, including row hammer errors. The memory controller 104, coupled to the memory device 102, is to adjust a refresh rate 108 of a region of the memory device including the row of memory and an adjacent row of memory for a period of time in response to a determination that an activation rate 106 of the row of memory approaches a row hammer rate.

In one example, the memory controller 104 may be compatible with various specifications including but not limited to double data rate 3 (DDR3) or double data rate 4 (DDR4). The memory controller 104 may have, due to their architecture, the ability to detect and identify aggressor rows, wherein an aggressor row is a row of the memory device 102 which receives a predetermined number of activations within a period of time. In other examples, aggressor rows may be determined via components other than the memory controller 104.

Identifying aggressor rows in various examples, may comprise determining an activation rate 106, which is a number of activations a row may receive in a period of time before affecting a row hammer error. This activation rate 160 may be determined such that the memory controller 104 has enough margin to identify and mitigate the effects of the row hammer before such errors occur.

In response to identifying an activation rate 106 and an aggressor row (e.g., an impacted row of the memory device), the memory controller 104 may adjust a refresh rate 108 of a region including the row of memory and one or more adjacent rows of memory, or alternatively the refresh rate of the row of memory and the adjacent row of memory. Adjusting the refresh rate 108 may comprise increasing the refresh rate. In various examples, the increased refresh rate 108 may vary, but in at least one example the increased refresh rate is two times (2x) the default rate. The increased refresh rate 108 may last for a period of time after initiation of the increased. In various examples the period of time may be predetermined, such that the increased refresh rate occurs for a static amount of time after identification, or alternatively, may be dynamic such that the increased refresh rate 108 is maintained as long as the activation rate remains above a predetermined threshold.

Figure 2:
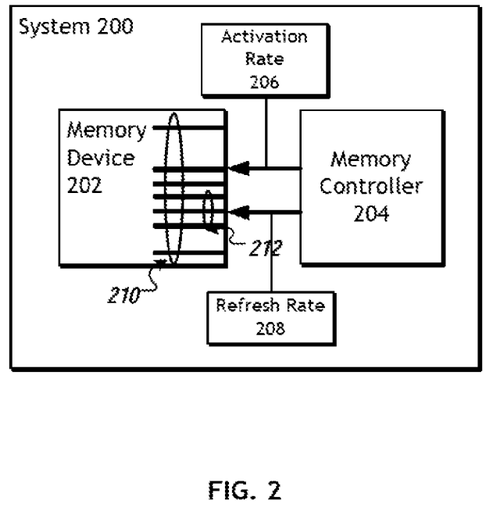
FIG. 2 is a block diagram of a system according to an example implementation.

Referring to FIG. 2, another system diagram is illustrated in accordance with an example of the present disclosure. The system 200 includes a memory device 202 having a plurality of word lines. The memory device 202 is coupled to a memory controller 204. The memory device 202 and the memory controller 204 may be generally similar to those discussed with reference to FIG. 1.

In FIG. 2, the memory controller 204 may monitor an activation rate 206 of word lines 210 of memory device 202. The memory controller 204 may determine whether an activation rate of one of word lines 210 is receiving a predetermined number of activations within a period of time, for example a default refresh period. The predetermined number of activations to indicate that the row of memory is approaching a row hammer rate, wherein the row hammer rate is a rate of activations at which other rows of memory may be impacted.

In response to determining that the activation rate of a row of memory 210 is approaching a row hammer rate, the memory controller may adjust the refresh rate of the row of memory and an adjacent row of memory, identified in FIG. 2 as 212. In various examples, adjusting the refresh rate of the row of memory and the adjacent row of memory may comprise adjusting the refresh rate of the memory device, a region of the memory device, or identified rows. The refresh rate may be increased by a factor, such as a factor of two. Once increased, the memory controller 204 may maintain the increased refresh rate 208 for a period of time.

In one example, the period of time may be determined based upon the length of time the activation rate of the row of memory remains above a threshold after approaching the row hammer rate. In other words, once increased, the memory controller may utilize one or more other thresholds as a metric upon which to determine how long the increased refresh rate should be maintained.

In another example, the memory controller 204 is to maintain the increased refresh rate 208 until the activation rate of the row of memory decreases below a threshold for a period of time. The threshold may be determined such there is a low likelihood of having to increase the refresh rate shortly after the decrease. Other examples are contemplated.

Referring to FIGS. 3-7, various flow diagrams are illustrated in accordance with examples of the present disclosure. The flow diagrams are merely for illustrative purposes and are not meant to limit the present disclosure to any particular order of operations nor are they intended to indicate that all operations are necessary for all examples. Rather, in various examples, operations may occur in orders other than those illustrated in the included Figs.

Figure 3:
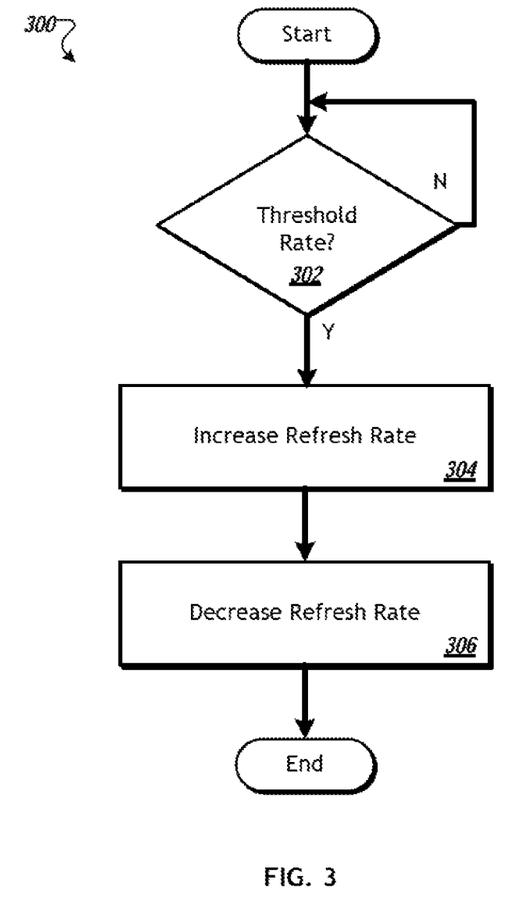
FIGS. 3-7 are flow diagrams depicting techniques associated with systems of FIG. 1 or 2 in accordance with example implementations.

Referring to FIG. 3, a first flow diagram 300 is illustrated in accordance with an example of the present disclosure. The flow diagram 300 may begin and progress to 302 where a memory controller, for example the memory controller illustrated in FIGS. 1-2, may determine whether a row of a memory has been activated at a threshold rate, wherein the threshold rate is less than a row hammer rate. If the memory controller determines that the row of memory has not been activated more than a threshold rate, the method may continually monitor as indicated.

In contrast, if the memory controller determines that the row of memory has been activated more than a threshold rate, the flow diagram may continue to 304 where the memory controller may increase a refresh rate of for the row of memory and an adjacent row of memory. The increase in the refresh rate may be in response to the determination at 302 and may prevent or mitigate a row hammer error.

In response to increasing the refresh rate, the memory controller may decrease the refresh rate for the row of memory and the adjacent row of memory at 306. Decreasing the refresh rate may be based on a memory provision subsequent to the increase. A memory provision, as used herein, is a predetermined operating characteristic or rule for decreasing the refresh rate. Upon decreasing the refresh rate, the flow diagram may end. Ending, may include the continued monitoring of activation rates for the plurality of word lines of the memory device.

Figure 4:
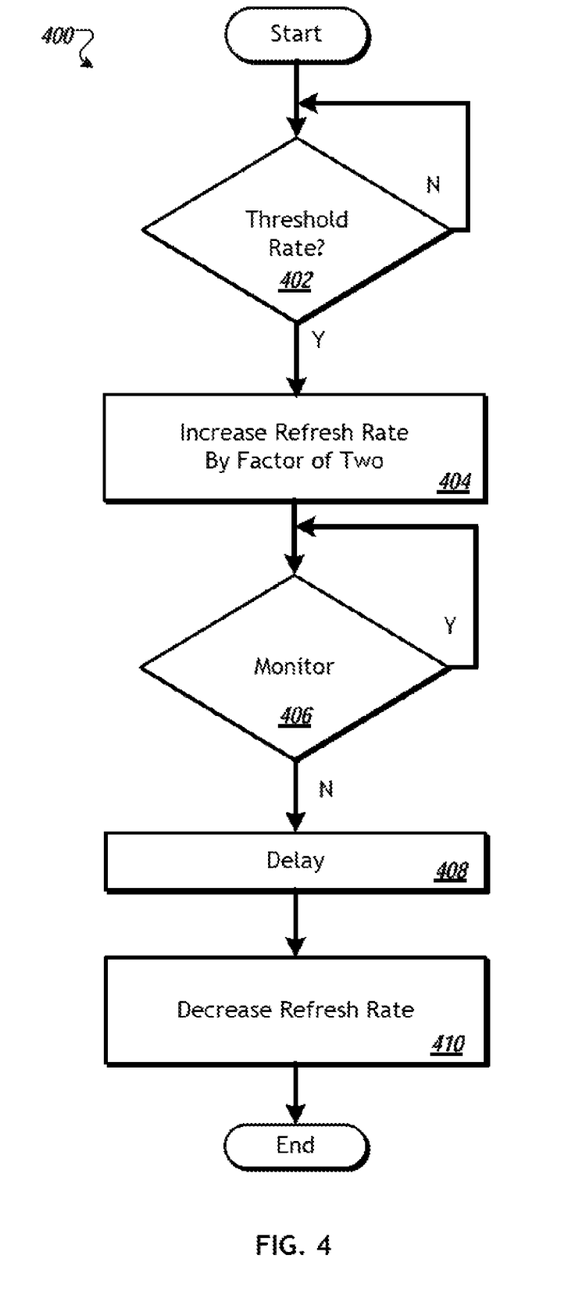

Referring to FIG. 4, another flow diagram is illustrated in accordance with an example of the present disclosure. The flow diagram 400 may begin and continue to 402 where a memory controller may determine whether a row of memory has been activated at a threshold rate, wherein the threshold rate is less than a row hammer rate. In various examples the threshold rate may be determined such that a row which reaches the threshold rate does not trigger a row hammer error, but is substantially likely to should additional activations be received. If the memory controller determines that the threshold has not been met, the memory controller may continue to monitor the rows of the memory device.

In contrast, if the memory controller determines that the row of memory has been activated at the threshold rate, the flow diagram may continue to 404 where the memory controller may increase the refresh rate by a factor of two. In various other examples, the factor of increase may vary. Upon increasing the refresh rate at 404, the memory controller may monitor the row of memory to determine whether the row of memory is continually being activated at the threshold rate at 406.

If the memory controller determines that the row of memory is continually being accessed at the threshold rate, the memory controller may maintain the increased refresh rate and continue monitoring at 406. In contrast, if the memory controller determines that the activation rate is not above the threshold rate, the memory controller may decrease the refresh rate for the row of memory and the adjacent row of memory based on a memory provision at 410. In various examples, prior to decreasing the refresh rate, the memory controller may insert a delay 408 to implement hysteresis in moving toward a decreased refresh rate at 410.

Upon decreasing the refresh rate, the method may end. In various examples, ending may include the continued monitoring of various threshold rates at 402.

Figure 5:
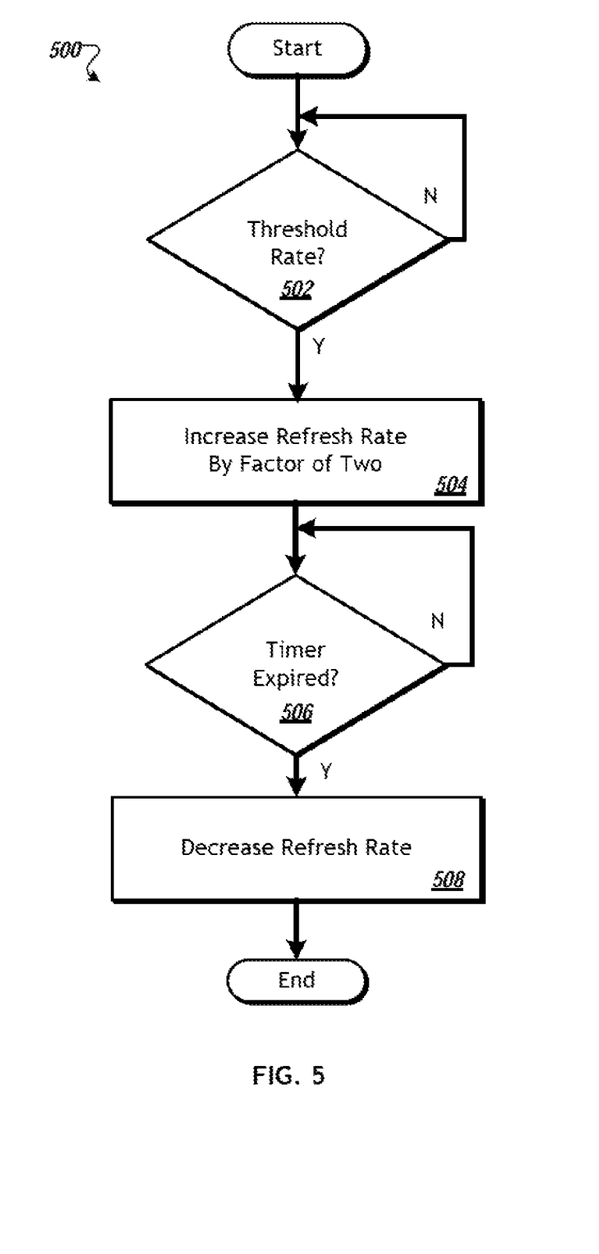

Referring to FIG. 5, another flow diagram is illustrated in accordance with various examples. The flow diagram 500 may begin and progress to 502 where a memory controller may determine whether a row of memory has been activated at a threshold rate, wherein the threshold rate is less than a row hammer rate. In various examples the threshold rate may be determined such that a row which reaches the threshold rate does not trigger a row hammer error, but is substantially likely to should additional activations be received. If the memory controller determines that the threshold has not been met, the memory controller may continue to monitor the rows of the memory device.

In contrast, if the memory controller determines that the threshold has been met, that the activation rate of the row of memory is approaching the row hammer rate, for example by determining that an activate count has reached a predetermined threshold in a period of time, the memory controller may increase the refresh rate by a factor of two at 504.

Upon increasing the refresh rate at 504, the memory controller may initiate a timer at 506. The memory controller may then determine whether the timer has expired at 506. Upon the timer expiring, the memory controller may then decrease the refresh rate for the row of memory and the adjacent row of memory. The refresh rate may be decreased to a default refresh rate. The method may then end. In various examples, ending, may include the continued monitoring of the memory device at 502.

Figure 6:
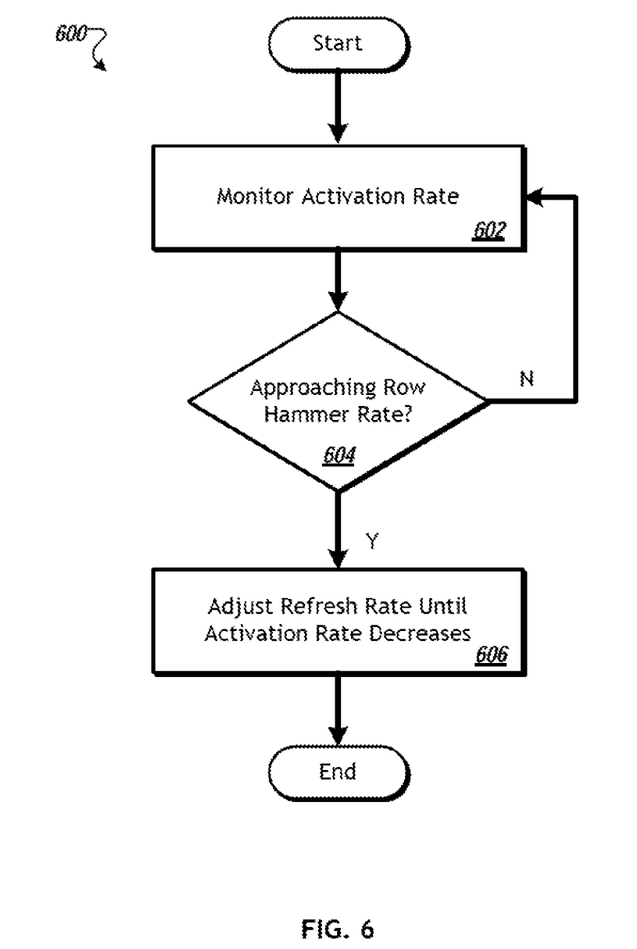

Referring to FIG. 6, another flow diagram is illustrated. The flow diagram 600 may begin and progress to 602 where a computing device may monitor an activation rate of a row of memory in a memory device. The computing device may determine whether the activation rate of the row of memory is approaching a row hammer rate at 604. In response to a determination at the activation rate is not approaching the row hammer rate, the computing device may continue to monitor the activation rate at 602.

In contrast, if the computing device makes a determination that the activation rate is approaching the row hammer rate at 604, the computing device may adjust the refresh rate for the row of memory and the adjacent row of memory until the activation rate of the row of memory decreases. The method may then end. As stated previously, ending, in various examples may include the continued monitoring of activation rates.

Figure 7:
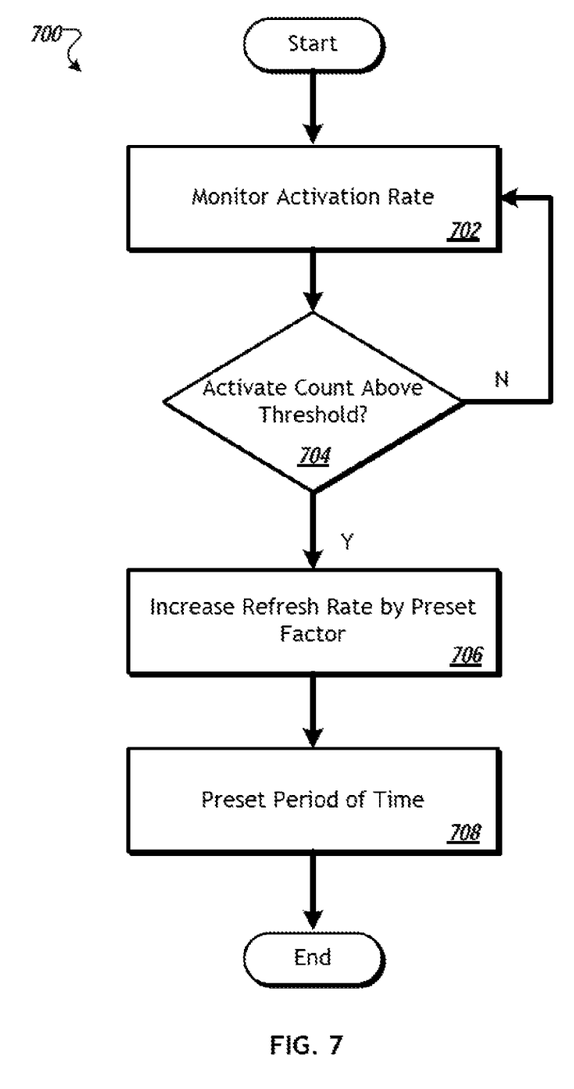

Referring to FIG. 7, another flow diagram is illustrated in accordance with an example. The flow diagram 700 may begin and progress to 702 where a computing device may monitor the activation rate of a row of memory. Based on the monitoring, the computing device may determine whether an activate count has reached a predetermined threshold during a period of time. If the computing device does not determine the activate count has reached a predetermined threshold the computing device may continue to monitor the activation rate.

In contrast, if the computing device determines that the activate count is above a threshold at 704, the computing device may increase the refresh rate by a preset factor at 706. The computing device may increase the refresh rate for a period of time after the activation rate of the row of memory. Upon expiration of the preset period of time 708, the computing device may return the refresh rate to a default refresh rate. The method may then end. Ending, as explained previously, may include the continued monitoring of activation rates of one or more memory devices.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   determining, by a memory controller, that a row of memory has been activated at a threshold rate of activation, wherein the threshold rate of activation is less than a rate of activation at which other rows of the memory are impacted;
   detecting aggressor rows prior to a row hammer error occurring to mitigate effects of the row hammer error, wherein the aggressor rows are rows of the memory that receive a predetermined number of activations within a period of time;
   increasing, by the memory controller and in response to the detecting aggressor rows, a refresh rate for a region which contains the row of memory and an adjacent row of memory;
   delaying, by the memory controller and to implement hysteresis, a decrease in the refresh rate for the region which contains the row of memory and the adjacent row of memory for a period of time; and
   decreasing, by the memory controller, the refresh rate for the region which contains the row of memory and the adjacent row of memory based on a predetermined operating characteristic for decreasing the refresh rate for the region subsequent to the increase.

2. The method of claim 1, wherein decreasing the refresh rate for the region which contains the row of memory and the adjacent row of memory based on the predetermined operating characteristic for decreasing the refresh rate for the region comprises decreasing the refresh rate for the region based on an expiration of a period of time.

3. The method of claim 1, further comprising:
   monitoring, via the memory controller, the row of memory after increasing the refresh rate for the region to determine whether the row of memory is continually being activated at the threshold rate of activation; and
   wherein decreasing the refresh rate for the region which contains the row of memory and the adjacent row of memory based on the predetermined operating characteristic for decreasing the refresh rate for the region comprises decreasing the refresh rate for the region based on the monitoring indicating the row of memory is not being activated at the threshold rate of activation.

4. The method of claim 3, wherein the delaying the decreasing for a period of time is in response to the monitoring indicating the row of memory is not being activated at the threshold rate of activation.

5. The method of claim 1, wherein increasing the refresh rate for the region comprises increasing the refresh rate for the region by a factor of two.

6. The method of claim 1, wherein increasing the refresh rate for the region which contains the row of memory and an adjacent row of memory comprises increasing a refresh rate for a device comprising the row of memory and the adjacent row of memory.

7. The method of claim 1, wherein decreasing the refresh rate for the region which contains the row of memory and the adjacent row of memory comprises returning the refresh rate for the region to a default refresh rate.

8. A method comprising:
   monitoring, by a computing device, an activated rate of a row of memory in a memory device;
   determining, by the computing device, that the activation rate of the row of memory is approaching a rate of activation at which other rows of the memory are impacted;
   detecting aggressor rows prior to a row hammer error occurring to mitigate effects of the row hammer error, wherein the aggressor rows are rows of the memory that receive a predetermined number of activations within a period of time;
   adjusting, by the computing device and in response to the detecting aggressor rows, a refresh rate for the row of memory and an adjacent row of memory until the activation rate of the row of memory decreases; and
   delaying a decrease in the refresh rate for the row of memory and an adjacent row of memory for a period of time.

9. The method of claim 8, wherein determining that the activated rate of the row of memory is approaching the rate of activation at which other rows of the memory are impacted comprises determining that an activate count has reached a predetermined threshold of activation in a period of time.

10. The method of claim 8, wherein adjusting the refresh rate for the row of memory and the adjacent row of memory comprises increasing a refresh rate for a region including the row of memory and the adjacent row of memory by a preset factor until the activated rate of the row of memory decreases to a predetermined threshold of activation.

11. The method of claim 8, wherein adjusting the refresh rate for the row of memory and the adjacent row of memory comprises adjusting a refresh rate for a region of the memory device including the row of memory.

12. The method of claim 8, wherein adjusting the refresh rate for a region which contains the row of memory and the adjacent row of memory comprises adjusting the refresh rate for the region for a period of time after the activated rate of the row of memory decreases.

13. A system comprising:
a memory device; and
a memory controller coupled to the memory device, the memory controller to:
detect aggressor rows prior to a row hammer error occurring to mitigate effects of the row hammer error, wherein the aggressor rows are rows of the memory that are determined to receive a predetermined number of activations within a period of time;
adjust, and in response to the detecting aggressor rows, a refresh rate of a row of memory and an adjacent row of memory for a period of time in response to a determination that an activated rate of the row of memory approaches a rate of activation at which other rows of the memory are impacted.

14. The system of claim 13, wherein the period of time is determined based upon a length of time the activated rate of the row of memory remains above a threshold rate of activation after approaching the rate of activation at which other rows of the memory are impacted.

15. The system of claim 13, wherein the memory controller is to increase the refresh rate of the row of memory and the adjacent row of memory until the activated rate of the row of memory decreases below a threshold rate of activation for a period of time.

* * * * *